(12) United States Patent
Higashida et al.

(10) Patent No.: US 8,059,331 B2
(45) Date of Patent: Nov. 15, 2011

(54) LIGHT CONTROL FILM AND LIGHT CONTROL GLASS

(75) Inventors: Osamu Higashida, Hitachi (JP); Hitoshi Yamazaki, Hitachi (JP); Shigeshi Ohno, Chikusei (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/520,291

(22) PCT Filed: Dec. 21, 2007

(86) PCT No.: PCT/JP2007/074748
§ 371 (c)(1),
(2), (4) Date: Jun. 19, 2009

(87) PCT Pub. No.: WO2008/075773
PCT Pub. Date: Jun. 26, 2008

(65) Prior Publication Data
US 2010/0014150 A1 Jan. 21, 2010

(30) Foreign Application Priority Data
Dec. 21, 2006 (JP) .................................. 2006-344177

(51) Int. Cl.
*G02B 26/00* (2006.01)
(52) U.S. Cl. ........................................ 359/296; 359/245
(58) Field of Classification Search ................ 359/296
See application file for complete search history.

(56) References Cited

U.S. PATENT DOCUMENTS

| | | |
|---|---|---|
| 2,041,138 A | 5/1936 | Land |
| 2,306,108 A | 12/1942 | Land et al. |
| 2,375,963 A | 5/1945 | Thomas |
| 4,270,841 A | 6/1981 | Saxe |
| 4,422,963 A | 12/1983 | Thompson et al. |
| 5,149,351 A * | 9/1992 | Yaba et al. .................... 65/60.2 |
| 6,049,366 A | 4/2000 | Hakemi et al. |
| 6,219,113 B1 * | 4/2001 | Takahara ..................... 349/42 |
| 7,897,993 B2 * | 3/2011 | Ono et al. .................... 257/103 |
| 2003/0107797 A1 * | 6/2003 | Saxe .............................. 359/296 |
| 2005/0270628 A1 | 12/2005 | Miyazaki |
| 2006/0132945 A1 | 6/2006 | Sano |
| 2008/0030126 A1 * | 2/2008 | Scholz et al. ................ 313/503 |

FOREIGN PATENT DOCUMENTS

| | | |
|---|---|---|
| GB | 433455 | 8/1935 |
| JP | 58-184129 | 10/1983 |
| JP | 08-503314 | 4/1996 |

(Continued)

OTHER PUBLICATIONS

English translation of International Preliminary Report on Patentability dated Jul. 2, 2009.

(Continued)

*Primary Examiner* — Scott J Sugarman
*Assistant Examiner* — James Jones
(74) *Attorney, Agent, or Firm* — Antonelli, Terry, Stout & Kraus, LLP.

(57) ABSTRACT

The present invention relates to a light control film, comprising:
    two transparent electroconductive resin substrates; and
    a light control layer sandwiched by the two transparent electroconductive resin substrates,
    wherein the light control layer contains a resin matrix and a light control suspension dispersed in the resin matrix, and the thickness of the transparent electroconductive resin substrates is from 10 to 80 μm.

12 Claims, 2 Drawing Sheets

FOREIGN PATENT DOCUMENTS

| | | |
|---|---|---|
| JP | 09-113939 | 5/1997 |
| JP | 2002-082364 | 3/2002 |
| JP | 2002-189123 | 7/2002 |
| JP | 2004-361835 | 12/2004 |
| JP | 2005-300962 | 10/2005 |
| JP | 2006-064832 | 3/2006 |
| JP | 2006-184820 | 7/2006 |

OTHER PUBLICATIONS

EP Search of Appln. No. 07851100.3 dated Apr. 22, 2010 in English.

Official Action mailed on Aug. 17, 2011, in connection with European application No. 07 851 100.3, 5 pages, European Patent Office, Munich, Germany.

* cited by examiner

LIGHT CONTROL FILM AND LIGHT CONTROL GLASS

TECHNICAL FIELD

The present invention relates to a light control film and a light control glass. The present invention specifically relates to a light control film that is preferably used for a window pane, various flat display elements, alternate products of various liquid crystal display elements, a light shutter, display plates for advertisement and guide, eyeglasses, sunglasses and others, and a light control glass using the same.

BACKGROUND ART

Light control films are a material that gives a light transmittance varied in accordance with whether or not an electric field is applied thereto, so as to be able to adjust the incident light amount. Known is, for example, a light control film being obtained by sandwiching a light control layer between transparent electroconductive resin substrates, the light control layer being obtained by dispersing a light control suspension in which a light control particles are dispersed, into a resin matrix, the light control particles responding to an electric field. This light control film is a film in which fine droplets of the light control suspension in which the light control particles are dispersed, are dispersed in the resin matrix, which is cured by irradiation with ultraviolet rays. In this light control film, the light control particles absorb, scatter or reflect light by Brownian motion in the state that no electric field is applied thereto; thus, incident light into the film cannot penetrate through the film. When an electric field is applied thereto, the light control particles are oriented in the direction parallel to the electric field by the polarization of the particles; thus, incident light to the film can penetrate through the film. In such a way, in a light control film, the amount of transmitted light is adjusted in accordance with the response of light control particles therein to an electric field (see Japanese Patent Application National Publication No. 8-503314).

As such a light control film, known is a film in which a light control layer is formed directly between two glass plates. For example, Japanese Patent Application National Publication No. 8-503314 discloses, in an example thereof, a light control film obtained by forming a light control layer about 100 μm in thickness on a polyester sheet 127 μm in thickness, curing the light control layer, transferring the cured layer onto a glass plate, about 3 mm in thickness, covered with ITO, peeling off the polyester sheet and then sandwiching the light control layer between the glass plate and another glass plate equivalent thereto. Japanese Patent Application Laid-Open (JP-A-) No. 9-113939 discloses, in an example thereof, a light control film formed by forming a light control layer so as to the thickness is about 50 μm, onto each of two glass substrates each coated with ITO, and then integrating these members into one unit in a vacuum. However, such a method of forming a light control layer directly onto glass plates is poor in workability, for example, for the formation of the layer onto glass substrates having a large area. Moreover, the film thickness of the light control layer is not easily made uniform; thus, it is difficult to yield a light control film which is uniform as a whole and has an excellent light control performance.

As a film for improving this film, known is a light control film obtained by applying a light control material onto each of polyester films 125 μm in thickness, having a surface on which an ITO transparent electrode film is formed, so as to yield two films with the light control material, and then stacking the two films onto each other (see Examples of JP-A No. 2002-189123). Additionally, JP-A Nos. 2005-300962, 2006-64832 and others give descriptions over a wide scope which include the following content: in a case where transparent substrates between which a light control layer is to be sandwiched are each a glass, the thickness is preferably from 1 to 15 mm; and in a case where the substrates are each a polymeric film, the thickness is preferably from 10 to 1000 μm. However, examples thereof disclose only a method of forming a light control layer directly between glass plates, as described in JP-A No. 9-113939. The use of polymeric films as substrates is neither specifically described nor sufficiently investigated in the actual circumstances.

DISCLOSURE OF THE INVENTION

According to the method described in JP-A No. 2002-189123 in which polymeric films are used as transparent substrates, which is different from the method of forming a light control layer directly onto glass substrates, a polymeric film with flexibility is supplied into the form of a roll so that a light control film can be continuously formed; thus, the method is excellent in workability and can further supply a long light control film wherein a light control layer is uniform. Moreover, the resultant light control film can be caused to adhere, as it is, onto a different substrate, such as an ordinary glass. For this reason, the light control film is excellent in multiusability. However, when the light control films described in JP-A No. 2005-300962, in particular, the films described in Examples thereof are each caused to adhere onto a substrate having a curved surface which may be of various types, such as a gently-curved surface, or a surface wherein a bent region having a small radius is present, the film does not easily follow the surface so that the light control performance is lost or is largely deteriorated. Alternatively, even when the film is caused to adhere satisfactorily thereto once, a problem that the film is peeled off may be caused.

The present invention is an invention for solving such problems, and provides the following: a light control film which is applicable to various glass substrates and others, and makes it possible to yield a light control glass having, as a whole, a uniform external appearance and a uniform and stable light control performance even when the film is applied to a glass substrate or the like that has a curved surface which may be of various types, and a light control glass using this film.

The inventors have made eager investigations, so as to find out that the problems can be solved mainly by use of polymeric films each having specified film thicknesses as transparent substrates.

Accordingly, the present invention relates to a light control film including two transparent electroconductive resin substrates and a light control layer sandwiched between the two transparent electroconductive resin substrates, wherein the light control layer contains a resin matrix and a light control suspension dispersed in the resin matrix, and the thickness of the transparent electroconductive resin substrates is from 10 to 80 μm.

The present invention also relates to a light control film including two transparent electroconductive resin substrates and a light control layer sandwiched between the two transparent electroconductive resin substrates, wherein the light control layer contains a resin matrix and a light control suspension dispersed in the resin matrix, and the thickness of the transparent electroconductive resin substrates is from 20 to 70 μm.

It is preferred that the thicknesses of the two transparent electroconductive resin substrates used in the light control layer of the invention are equal to each other.

In an embodiment of the present invention, the thickness of the light control layer is preferably from 10 to 200 μm. In an embodiment of the invention, the light control layer preferably has therein no interfacial surface.

The present invention also relates to a light control glass including two glass plates and the above-mentioned light control film sandwiched between the two glass plates. In an embodiment of the invention, the glass plates are each a curved surface.

The disclosure of the present application is related to the subject matter described in Japanese Patent Application No. 2006-344177 filed on Dec. 21, 2006, and the contents disclosed therein are incorporated herein by reference.

BEST MODE FOR CARRYING OUT THE INVENTION

The light control layer in the present invention is a layer wherein droplets made from a light control suspension and having light control performance are dispersed in a resin matrix. The light control suspension contains a dispersing medium and light control particles dispersed in the dispersing medium. In the state that no electric field is applied to the light control film, the light control particles floated and dispersed in a flowing state in the droplets absorb, scatter or reflect light by Brownian motion; thus, light radiated into the film can hardly penetrate through the film. However, when an electric field is applied to the light control film, the light control particles are arranged in the direction parallel to the electric field since the light control particles have electric dipole moment; thus, light radiated into the film comes to penetrate through the film. In this way, the light control particles respond to the applied electric field, whereby the amount of transmitted light comes to be adjustable.

Examples of the light control particles in the present invention include inorganic fibers such as a polyiodide, carbon fiber and carbon nanofiber, carbon nanotube, metal-free phthalocyanine, and a metal phthalocyanine having, as its central metal, copper, nickel, iron, cobalt, chromium, titanium, beryllium, molybdenum, tungsten, aluminum, chromium or the like. The use of a polyiodide is particularly preferred.

The polyiodide may be a polyiodide produced by causing iodine and iodide to react with a material selected from the group consisting of pyrazine-2,3-dicarboxylic acid dihydrate, pyrazine-2,5-dicarboxylic acid dihydrate, and pyridine-2,5-dicarboxylic acid monohydrate. The thus-obtained polyiodide is, for example, a polyiodide represented by the following general formula:

$CaI_2(C_6H_4N_2O_4) \cdot XH_2O$ wherein X: 1 to 2, or $CaI_a(C_6H_4N_2O_4)_b \cdot cH_2O$ wherein a: 3 to 7, b: 1 to 2, and c: 1 to 3. The polyiodide is preferably in the form of needle crystal.

For the light control particles, the following compounds may be used: compounds disclosed in, for example, specifications of U.S. Pat. No. 2,041,138 (E. H. Land), U.S. Pat. No. 2,306,108 (Land et al.), U.S. Pat. No. 2,375,963 (Thomas), U.S. Pat. No. 4,270,841 (R. L. Saxe), GB Patent No. 433,455, and others. The compounds disclosed therein are each produced by selecting one from pyrazinecarboxylic acid and pyridinecarboxylic acid, causing the selected acid to react with iodine, chlorine or bromine, thereby converting the acid to a polyhalide such as a polyiodide, polychloride or polybromide. The polyhalide is a complex compound obtained by a reaction between a halogen atom and an inorganic or organic material. Detailed production processes thereof are disclosed in, for example, U.S. Pat. No. 4,422,963 (Saxe).

In the step of synthesizing the light control particles, it is preferred to use a polymeric material such as nitrocellulose in order to form particles having uniform sizes and improve the dispersibility of the particles in the light control suspension. By the use of the polymeric material, such as nitrocellulose, at the time of dispersing the light control suspension in the form of fine droplets in the resin matrix, which is in a solid form, the light control particles are easily dispersed or floated into the fine droplets so that the responsibility to an electric field tends to be improved.

In the present invention, the dispersing medium in the light control suspension fulfils a function of causing the light control particles to be dispersed in the state that the particles can flow. The dispersing medium is preferably a material which: adheres selectively to the light control particles; covers the light control particles; when a phase separation is caused between the dispersing medium and a polymeric medium, acts to cause the light control particles to be shifted to the droplet phase subjected to the phase separation; and neither has electroconductivity nor affinity with the polymeric medium. Furthermore, it is preferred to use a liquid copolymer having a refractive index similar to that of the resin matrix made from the polymeric medium when a light control film is finished. Preferred is, for example, a (meth)acrylic acid ester oligomer having a fluoro group and/or a hydroxyl group, and more preferred is a (meth)acrylic acid ester oligomer having a fluoro group and a hydroxyl group. When such a copolymer is used, any one monomer unit of the fluoro group and the hydroxyl group is directed to the light control particles and the other monomer unit acts to cause the light control suspension to be stably maintained as droplets in the polymeric medium. For this reason, the light control particles are easily dispersed in the light control suspension, and further at the time of the phase separation, the light control particles are easily derived into the droplets that undergo the phase separation. Examples of the (meth)acrylic acid ester oligomer having a fluoro group and/or a hydroxyl group include 2,2,2-trifluoroethyl methacrylate/butyl acrylate/2-hydroxyethyl acrylate copolymer, 3,5,5-trimethylhexyl acrylate/2-hydroxypropyl acrylate/fumaric acid copolymer, butyl acrylate/2-hydroxyethyl acrylate copolymer, 2,2,3,3-tetrafluoropropyl acrylate/butyl acrylate/2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafluoropentyl methacrylate/butyl acrylate/2-hydroxyethyl acrylate copolymer, and 1H,1H,2H,2H-heptadecafluorodecyl methacrylate/butyl acrylate/2-hydroxyethyl acrylate copolymer. These (meth) acrylic acid ester oligomers more preferably have both of a fluoro group and a hydroxyl group.

About these (meth)acrylic acid ester oligomers, the weight-average molecular weight in terms of standard polystyrene, which is measured by gel permeation chromatography, is preferably within the range of 1,000 to 20,000, more preferably within the range of 2,000 to 10,000. The use amount of the fluoro-group-containing monomer which is a raw material for the (meth)acrylic acid ester oligomers is preferably from 6 to 12% by mole of the entire monomers as the raw materials thereof, more preferably from 7 to 8% by mole thereof. If the use amount of the fluoro-group-containing monomer is more than 12% by mole, the refractive index tends to be increased so that the light transmittance lowers. The use amount of the hydroxyl-group-containing monomer which is a raw material for the (meth)acrylic acid ester oligomers is preferably from 0.5 to 22% by mole of the entire monomers as the raw materials thereof, more preferably from 1 to 8% by mole thereof. If the use amount of the hydroxyl-group-containing monomer is more than 22% by mole, the refractive index tends to be increased so that the light transmittance lowers.

The light control suspension in the present invention contains the light control particles preferably in an amount of 1 to 70% by weight of the light control suspension, more preferably in an amount of 4 to 50% by weight thereof. The suspension also contains the dispersing medium preferably in an amount of 30 to 99% by weight of the light control suspension, more preferably in an amount of 50 to 96% by weight thereof. The light control suspension is also contained in the polymeric medium preferably in an amount of 1 to 100 parts by weight, more preferably in an amount of 4 to 70 parts by weight, even more preferably in an amount of 6 to 60 parts by weight, in particular preferably in an amount of 8 to 50 parts by weight relative to 100 parts by weight of the polymeric medium.

The light control layer in the present invention contains a resin matrix, and the light control suspension, which is dispersed in the resin matrix. The light control layer can be formed by use of, for example, a light control material containing a polymeric medium for forming the resin matrix and the light control suspension.

The polymeric medium for forming the resin matrix in the light control layer in the present invention is preferably a polymeric medium that is cured by irradiation with an energy ray. In the present invention, the polymer medium which is cured by irradiation with an energy ray, is, for example, a polymeric composition containing a photopolymerization initiator, and a polymeric compound that is cured by effect of ultraviolet rays, visible rays, an electron beam, or some other energy beam or ray(s). The polymeric composition is, for example, a polymeric composition containing a polymeric compound having a substituent having an ethylenically unsaturated bond and a photopolymerization initiator.

The polymeric compound having a substituent having an ethylenically unsaturated bond is preferably silicone resin, acrylic resin, polyester resin or the like from the viewpoint of easiness of the synthesis, the light control performance and durability, and others. These resins preferably have the following substituent from the viewpoint of the light control performance, the durability, and others: an alkyl group such as a methyl, ethyl, propyl, isopropyl, butyl, isobutyl, tert-butyl, amyl, isoamyl, hexyl or cyclohexyl group, or an aryl group such as a phenyl or naphthyl group.

Specific examples of the silicone resin include polymeric compounds described in Japanese Patent Application Publication (JP-B) No. 53-36515, JP-B No. 57-52371, JP-B No. 58-53656, and JP-B No. 61-17863.

The silicone resin is synthesized, for example, by subjecting the following compounds to dehydrogenating condensation reaction and dealcoholization reaction in the presence of tin 2-ethylhexane as an organic tin catalyst:

a siloxane polymer having a silanol group at both terminals thereof, such as silanol-both-terminated polydimethylsiloxane, silanol-both-terminated polydiphenylsiloxane/dimethylsiloxane copolymer or silanol-both-terminated polydimethyldiphenylsiloxane;

a trialkylalkoxysilane such as trimethylethoxysilane;

an ethylenically-unsaturated-bond-containing silane compound such as (3-acryloxypropyl)methyldimethoxysilane; and so on. The form of the resin is preferably a solvent-free form. In other words, when a solvent is used to synthesize the resin, it is preferred to remove the solvent after the synthesis reaction. The use amount of the ethylenically-unsaturated-bond-containing silane compound, such as (3-acryloxypropyl)methoxysilane, is preferably from 2 to 30% by weight of the whole of the siloxane and silane compounds as the raw materials, more preferably from 5 to 18% by weight thereof.

The acrylic resin can be yielded, for example, as follows: first, a main-chain-forming monomer, such as an alkyl (meth) acrylate, an aryl (meth)acrylate, benzyl (meth)acrylate or styrene, is copolymerized with a functional-group-containing monomer for introducing an ethylenically unsaturated bond, such as (meth)acrylic acid, hydroxylethyl (meth)acrylate, isocyanatoethyl (meth)acrylate or glycidyl (meth)acrylate, so as to synthesize a prepolymer once; next, a monomer for being caused to react with this prepolymer is subjected to addition reaction with the prepolymer, examples of the monomer including glycidyl (meth)acrylate, isocyanatoethyl (meth)acrylate, hydroxyethyl (meth)acrylate and (meth) acrylic acid.

The above-mentioned polyester resin can easily be produced by a known method.

About these polymeric compounds, which each have a substituent having an ethylenically unsaturated bond, the weight-average molecular weight in terms of polystyrene, which is obtained by gel permeation chromatography, is preferably within the range of 20,000 to 100,000, more preferably within the range of 30,000 to 80,000.

In the case of using the above-mentioned polymeric compound having a substituent having an ethylenically unsaturated bond, a photopolymerization initiator for activating radical polymerization by irradiation with an energy ray may be used. Specifically, the following may be used:

2,2-dimethoxy-1,2-diphenylethane-1-one, 1-(4-(2-hydroxyethoxy)phenyl)-2-hydroxy-2-methyl-1-propane-1-one, bis(2,4,6-trimethylbenzoyl)phenylphosphine oxide, 2-hydroxy-2-methyl-1-phenylpropane-1-one, (1-hydroxycyclohexyl)phenyl ketone, or the like.

The use amount of the photopolymerization initiator is preferably from 0.05 to 20 parts by weight, more preferably from 0.1 to 5 parts by weight relative to 100 parts by weight of the polymeric compound having a substituent having an ethylenically unsaturated bond.

It is allowable to use, besides the polymeric compound having a substituent having an ethylenically unsaturated bond, an organic-solvent soluble type resin or a thermoplastic resin together, examples of the resin including polyacrylic acid and polymethacrylic acid each having a weight-average molecular weight in terms of polystyrene within the range of 1,000 to 100,000, which is measured by gel permeation chromatography.

To the polymeric medium may be added a coloration preventive as an additive, such as dibutyltin dilaurate if necessary. A solvent may be contained in the polymer medium if necessary.

The light control layer in the present invention can be formed by use of a light control material which contains a polymeric medium for forming a resin matrix and a light control suspension as described above.

In the light control film of the present invention, the thickness of the used transparent electroconductive resin substrates is from 10 to 80 µm. If this thickness is more than 80 µm, the light control film tends to have a drawback that the light control performance thereof is lost or deteriorated or the film is easily peeled off when the film is applied to a substrate having a curved surface. As a result, it is impossible to yield a light control glass or the like that has a uniform external appearance and a uniform and stable light control performance as a whole. On the other hand, if the thickness is less than 10 µm, the film thickness easily becomes uneven and the film dapples or waves easily. Thus, the film tends to have a drawback that the film can neither gain a uniform external appearance nor a uniform and stable light control performance as a whole. From the viewpoint of the above, the thickness preferably ranges from 20 to 70 µm. It is also preferred that the thicknesses of the two transparent electroconductive resin substrates, between which the light control layer is sandwiched, are equal to each other since a warp, a peel or the like of the film is not easily generated by a change in temperature or the like.

Usually, the transparent electroconductive resin substrates in the present invention each have a transparent resin substrate, and a transparent electroconductive film formed on each surface of the transparent resin substrate for the application of an electric field for light control. Accordingly, the above-mentioned film thicknesses are each the film thickness of the transparent resin substrate plus the transparent electroconductive film. The transparent electroconductive film may be, for example, a film made of indium tin oxide (ITO), $SnO_2$, or $In_2O_3$. The surface resistance thereof is preferably from about 3 to 600 Ω/sq.

The resin of the transparent resin substrate itself is not particularly limited in kind as far as the resin is a resin having a sufficient transparency and can sufficiently adhere onto the electroconductive film or the light control layer. Examples thereof include a film of a polyester such as polyethylene terephthalate, a film of a polyolefin such as polypropylene, a film of polyvinyl chloride or a polyacrylic resin, and other resin films. A polyethylene terephthalate film is preferred since the film is excellent in transparency, formability, adhesiveness, workability and others.

The transparent electroconductive resin substrates in the present invention can each be available by selecting a film having a thickness suitable for the present invention appropriately from commercially available films such as transparent electroconductive films (manufactured by Toyobo Co., Ltd.) and ITO/PET films manufactured by Sheldahl, Inc.

The thickness of the above-mentioned transparent electroconductive film is not particularly limited, and is preferably from 10 to 5,000 nm. In order to prevent a short circuit phenomenon generated by a matter that the interval between the substrates is narrow and an alien substrate is incorporated therebetween, it is allowable to use a substrate wherein a transparent insulating layer having a thickness of about 200 to 1,000 angstrom (Å) is formed on a transparent electroconductive film. It is defined that the film thickness of this transparent insulating layer is not included in the film thickness of the transparent electroconductive resin substrate.

In the present invention, the film thickness of the transparent electroconductive resin substrates is defined as a combination of the film thickness of the transparent resin substrates and the film thickness of the transparent electroconductive films. However, when electroconductivity is given to a transparent resin substrate itself to render the substrate a transparent electroconductive resin substrate (when no transparent electroconductive film is formed on any transparent resin substrate surface), the film thickness of the transparent electroconductive resin substrate is defined as the thickness of the transparent resin substrate itself, which has electroconductivity.

In the present invention, it is preferred that the light transmittance of the transparent electroconductive resin substrates is 80% or more from the viewpoint of light control performance. The light transmittance of the transparent electroconductive resin substrates can be measured in accordance with Measuring Method of Overall Light Ray Transmittance in JIS K7105.

As the process for producing the light control film of the present invention, for example, the following methods are given: (I) First, a liquid light control suspension is mixed with a polymeric medium into a homogeneous form. Next, the mixture is made to a mixed liquid (light control material) wherein the light control suspension is dispersed in the form of droplets in the polymeric medium. Furthermore, this mixed liquid is applied onto a transparent electroconductive resin substrate so as to have a certain thickness. If necessary, the solvent is dried and removed under a reduced pressure. Thereafter, a high-pressure mercury lamp or the like is used to radiate ultraviolet rays thereto, so as to cure the polymeric medium into an appropriate degree. In such a way, two light-control-layer-formed transparent electroconductive resin substrates are prepared, and the two substrates are caused to adhere onto each other. Furthermore, the curing is optionally promoted. Thus, the members are integrated into one unit, thereby producing the light control film.

(II) A mixed liquid as described above is prepared, and this mixed liquid is applied onto a transparent electroconductive resin substrate so as to have a certain thickness. If necessary, the solvent is dried and removed under a reduced pressure. Next, another transparent electroconductive resin substrate is caused to adhere onto the workpiece. Thereafter, a high-pressure mercury lamp or the like is used to radiate ultraviolet rays thereto, so as to cure the polymeric medium appropriately.

In any one of the methods, the transparent electroconductive resin substrates can each be supplied in the form of a film roll. When the transparent electroconductive resin substrates are each wound off from the roll, the above-mentioned operation is performed on the substrate to yield a light control film and then the film is wound around a different roll, the light control film with a homogeneous light control layer having a uniform film thickness, can be continuously produced.

About the light control film of the present invention, the film thickness of the whole thereof also becomes small. Therefore, when the light control film is wound in a roll form and then stored or transported, the diameter of the winding core can be made small. The diameter of the winding core can be set into, for example, about 30 to 80 mm. Additionally, a large amount of the film can be wounded into a single roll. Thus, the light control film is also excellent in economical efficiency.

The thickness of the light control layer is not particularly limited, and is generally from 5 to 1000 μm. The thickness is preferably from 10 to 200 μm in order for the light control layer to exhibit a sufficient light control performance. By changing the mixing ratio between the polymeric medium becoming a resin matrix, and the liquid light control suspension variously, the light transmittance of the light control film can be adjusted.

The light control layer is preferably a layer having therein no interfacial surface from the viewpoint of the light control performance, the durability of the film, and others. The layer having therein no interfacial surface can be produced by, for example, the above-mentioned method (II). According to the method (I), two light control layers are caused to adhere to each other, so that an interfacial surface can easily be formed therebetween. An interfacial surface in the light control means a face of a boundary between pieces of the resin matrix. Naturally, a face of a boundary between the resin matrix and the light control suspension may be present in the light control layer.

In the yielded light control layer, the size of droplets (average droplet diameter) of the light control suspension dispersed in the resin matrix is preferably from 0.5 to 50 μm, more preferably from 1 to 10 μm in order to prevent the aggregation and sedimentation of the light control particles. The average droplet diameter can be determined, for example, by using an optical microscope to take a photographic image or some other image of the light control film from one of the surface directions of the film, measuring the diameters of plural arbitrarily-selected droplets therein, and then calculating the average value thereof. The average droplet diameter may be also determined by taking a visual field image of the light control film obtained through an optical microscope, as digital data, into a computer, and then using an image processing integration software.

Conditions for causing the light control film to exhibit a light control performance are not particularly limited. Usually, the power supply to be used is an alternating current power supply, and the light control film can be caused to act at 10 to 220 volts (effective value) and a frequency of 30 Hz to 500 kHz.

The light control film of the present invention can be preferably used in articles such as an indoor or outdoor partition, a window pane/skylight for building, various flat display elements used in the electronic industry and imaging instruments, various gauge boards, alternate products of the existing liquid crystal display elements, a light shutter, various display plates for indoor or outdoor advertisement and guide, window panes for aircrafts/railway vehicles/ships, window panes/back mirrors/sunroofs for automobiles, eyeglasses, sunglasses, sun visors, and others. The light control film is useful, in particular, for a substrate having a curved surface.

The using method thereof is, for example, a method of sandwiching the film between two substrates, or a method of causing the film to adhere onto a single surface of a substrate. The substrate(s) may (each) be a glass plate. The glass plate referred to in the present invention means a substrate transparent to visible rays and others. Examples thereof include ordinary glass plates made mainly of silicon dioxide, glass plates made of an inorganic material which may have various compositions, and resin glass plates made of an organic material such as transparent acrylic resin or polycarbonate resin. The use of the light control film of the present invention makes the following possible: even when the film is applied, in particular, to a glass or the like that has a curved surface, the film satisfactorily follows the surface and the light control performance does not become uneven, so that a light control glass is obtained which has a uniform external appearance and a uniform and stable light control performance as a whole.

The light control film is in a film state; thus, the following problems are not caused:

various problems of conventional light control glasses and conventional light control windows in which liquid crystal is used;

a change in color tone on the basis of irradiation with ultraviolet rays;

a fall in variable ability;

a response time gap which follows a voltage drop generated between the peripheral region and the central region of a transparent electroconductive substrate, the gap being peculiar to a large-sized product; and problems of an optical property plane.

With reference to the drawings, the structure and the action of the light control film according to the present invention will be described in more detail.

Figure 1:
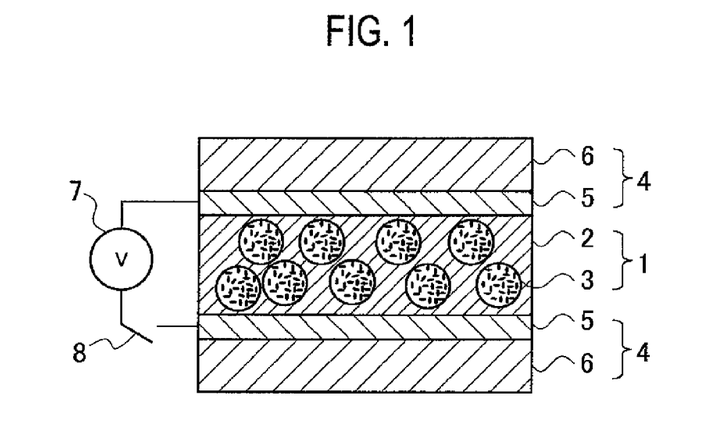
FIG. 1 is a schematic view of a sectional structure of an embodiment of the light control film of the present invention.

FIG. 1 is a schematic structural view of a light control film of an embodiment of the present invention. A light control layer 1 is sandwiched between two transparent electroconductive resin substrates 4 each made of a transparent resin substrate 6 coated with a transparent electroconductive film 5. By the changeover of a switch 8, a power supply 7 is connected or disconnected to the two transparent electroconductive films 5. The light control layer 1 is composed of a resin matrix 2 and a liquid light control suspension dispersed in the form of droplets 3 in the resin matrix 2.

Figure 2:
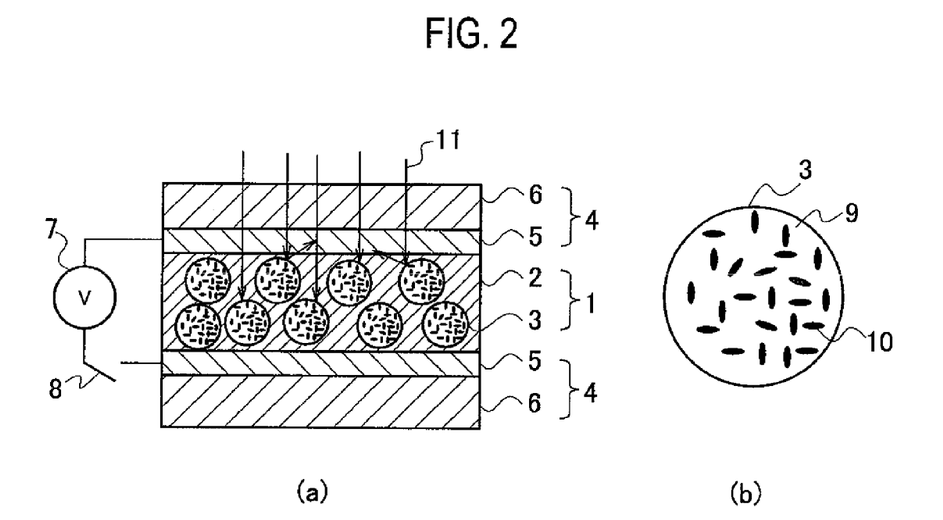
FIG. 2 are each a schematic view which is referred to in order to describe the action of the light control film in FIG. 1 when no electric field is applied thereto.
Figure 3:
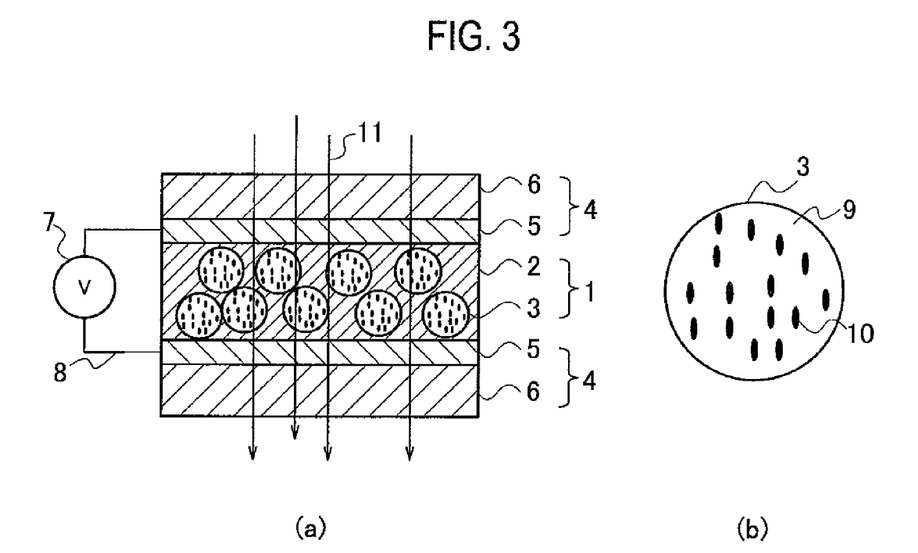
FIG. 3 are each a schematic view which is referred to in order to describe the action of the light control film in FIG. 1 when an electric field is applied thereto.

FIG. 2 is a view referred to in order to describe the action of the light control film illustrated in FIG. 1, and illustrates a case where the switch 8 is turned off so that no electric filed is applied. In this case, by Brownian motion of light control particles 10 dispersed in a dispersing medium 9 constituting the droplets 3 of the liquid light control suspension, incident light 11 is absorbed in the light control particles 10, or scattered or reflected thereon, so that the light 11 cannot penetrate. However, when the switch 8 is turned on to apply an electric field as illustrated in FIG. 3, the light control particles 10 are arranged in parallel to an electric field generated by the applied electric field, so that the incident light 11 passes between the arranged light control particles 10. In this way, light-transmitting function which neither causes a fall in scattering property nor a fall in transparency is given to the light control film.

The light control film of the present invention can be applied to various glass substrates, and others. Additionally, even when the film is applied to a substrate or the like that has a curved surface which may be of various types, a light control glass can be obtained which has a uniform external appearance and a uniform and stable light control performance as a whole. The curved-surface light control glass using the light control film of the present invention is a high-quality glass which has a uniform external appearance and a uniform and stable light control performance as a whole. Furthermore, about the light control film of the present invention, the film thickness of the whole thereof also becomes small; thus, when the light control film is wound in a roll form and then stored or transported, the diameter of the winding core thereof can be made small. Additionally, a large amount of the film can be wound in a single-film form. Thus, the film is excellent in economical efficiency.

EXAMPLES

Hereinafter, the present invention will be more specifically described by way of Examples of the present invention and comparative examples.

Production Example of Light Control Particles

In order to produce light control particles, in a 500-mL four-necked flask equipped with a stirrer and a cooling tube, 4.5 g of iodine (JIS extra pure reagent, manufactured by Wako Pure Chemical Industries, Ltd.) was dissolved in a solution composed of 87.54 g of a 15% by weight solution of nitrocellulose ¼ LIG ((trade name) manufactured by Bergerac NC Co.), which was diluted with isoamyl acetate (extra pure reagent, manufactured by Wako Pure Chemical Industries, Ltd.), 44.96 g of isoamyl acetate, 4.5 g of dehydrated $CaI_2$ (for chemistry, manufactured by Wako Pure Chemical Industries, Ltd.), 2.0 g of anhydrous methanol (for organic synthesis, manufactured by Wako Pure Chemical Industries, Ltd.), and 0.6 purified water (purified water, manufactured by Wako Pure Chemical Industries, Ltd.), and then thereto was added 3 g of pyrazine-2,5-dicarboxylic acid dihydrate (manufactured by Polycarbon Industries), which is a base-forming material of light control particles. The solution was then stirred at 45° C. for 3 hours to terminate the reaction. Thereafter, an ultrasonic disperser was used to disperse the material for 2 hours.

Next, in order to take out light control particles having predetermined sizes from the reaction solution, a centrifuge was used to separate particles. The reaction solution was centrifuged at a velocity of 750 G for 10 minutes to remove a precipitation, and further centrifuged at 7390 G for 2 hours to remove a floating material. In this way, 9 g of precipitation particles were collected. The whole of the precipitation particles was dispersed in 88 g of isoamyl acetate. The precipitation particles were in the form of needle crystal having an average particle diameter of 0.36 μm, which was measured with a submicron particle analyzer (N4MD, manufactured by Beckman Coulter GmbH). The precipitation particles were used as light control particles.

Production Example of Light Control Suspension 97 g of a dispersion liquid of the precipitation particles (light control particles) yielded (in Production Example of Light Control Particles) in isoamyl acetate was added to 59 g of a copolymer of a butyl acrylate (Wako extra pure, manufactured by Wako Pure Chemical Industries, Ltd.)/2,2,2-trifluoroethyl methacrylate (for industry, manufactured by Kyoeisha Chemical Co., Ltd.)/2-hydroxyethyl acrylate (Wako first class, manufactured by Wako Pure Chemical Industries, Ltd.) (ratio by mole between the monomers: 18/1.5/0.5, weight-average molecular weight: 2,200, refractive index: 1.468) as a dispersing medium of light control suspension. A stirrer was used to mix the components for 30 minutes to yield a mixed solution. Next, a rotary evaporator was used to remove isoamyl acetate from the mixed solution under a reduced pressure, i.e., in a vacuum of 60 Pa pressure at 80° C. for 3 hours. Thereto were then added 29.5 g of decyl trimellitate (manufactured by Kao Corp.) and dimethyl dodecasuberate (manufactured by Exfluor Co.) to produce a stable liquid light control suspension, wherein particle sedimentation and aggregation phenomena were not caused.

Production Example of Ultraviolet Curing Silicone Resin

Into a four-necked flask equipped with a Dean-Stark trap, a cooling tube, a stirrer, and a heater were charged 11.75 g of silanol-both-terminated polydimethylsiloxane (reagent, manufactured by Chisso Corp.), 31 g of silanol-both-terminated polydimethyldiphenylsiloxane (reagent, manufactured by Chisso Corp.), 4 g of (3-acryloxypropyl)methyldimethoxysilane (reagent, manufactured by Chisso Corp.), and 0.6 g of tin 2-ethylhexane (manufactured by Wako Pure Chemical Industries, Ltd.), and then the solution was refluxed in heptane at 100° C. for 3 hours to conduct reaction.

Next, to the reaction solution was added 10.6 g of trimethylethoxysilane (reagent, manufactured by Chisso Corp.), and the solution was then refluxed for 2 hours to conduct dealcolization reaction. Thereafter, a rotary evaporator was used to remove heptane under a reduced pressure, i.e., in a vacuum of 60 Pa pressure at 80° C. for 3 hours to yield an ultraviolet curing silicone resin (silicone resin having a substituent having an ethylenically unsaturated bond) having a weight-average molecular weight of 40,000 and a refractive index of 1.468.

Example 1

Into 62.4 g of the ultraviolet curing silicone resin yielded (in Production Example of Ultraviolet Curing Silicone Resin) was dissolved 0.2 g of bis(2,4,6-trimethylbenzoyl)phenylphosphine oxide (manufactured by Ciba Specialty Chemicals Inc.) as a photopolymerization initiator at 50° C., and then thereto was added 37.5 g of the light control suspension yielded (in Production Example of Light Control Suspension) to mix the components mechanically for 1 minute. In this way, a light control material was produced.

A polyester film having a surface electric resistance of 200 to 300 Ω/Sq and coated with a transparent electroconductive film (thickness: 300 Å) made of ITO (indium tin oxide) (ITO/PET films manufactured by Sheldahl, Inc., thickness: 30 μm) was pulled out from a roll, and then an automatic applying machine (manufactured by Testa Kogyo Kabushiki Kaisha) was used to apply the above-mentioned light control material onto the film by means of a Baker type applicator (scale: 14) so as to give a dry thickness of 90 μm. Thereafter, the same polyester film as described above was laminated onto the applied layer. Next, a metal halide lamp of 160 W/cm² illuminance was used to radiate ultraviolet rays of UV-A having an energy of 4,000 mJ/cm² onto the applied layer, so as to produce a light control film having a light control layer wherein the light control particle suspension was dispersed in the form of spherical droplets in the ultraviolet-cured silicone resin.

The droplet size (average droplet diameter) of the light control suspension in the light control film was 2 μm on average. The droplet size (average droplet diameter) of the light control suspension in the light control film was obtained by taking a photograph of the light control film from one of the surface directions of the film by means of an optical microscope through a 200-power visual field, measuring the diameters of 50 arbitrarily-selected ones out of the droplets in the light control suspension, and then calculating the average value thereof.

Example 2

The same operations as in Example 1 were conducted except that the light control material was decreased in amount, and the decreased material was applied to set the dry film thickness of the material to 45 μm.

Example 3

A light control film was produced in the same way as in Example 1 except that the transparent electroconductive resin substrates were each changed to a polyester film (thickness: 50 μm) coated with a transparent electroconductive film (thickness: 300 Å) made of ITO (indium tin oxide) and having a surface electric resistance of 200 to 300Ω.

Example 4

The same operations as in Example 3 were conducted except that the light control material was decreased in amount, and the decreased material was applied to set the dry film thickness of the material to 45 μm.

Example 5

A light control film was produced in the same way as in Example 1 except that the transparent electroconductive resin substrates were each changed to a polyester film (thickness: 70 μm) coated with a transparent electroconductive film (thickness: 300 Å) made of ITO (indium tin oxide) and having a surface electric resistance of 200 to 300 Ω.

In Table 1 are shown the light transmittance of each of the produced light control films which was measured when no voltage was applied thereto, and when a 400-Hz alternating current voltage (execution value) of 100 V was applied thereto. The light control film was laminated and adhered onto a 0.25-m² glass plate having a curved surface (radius: 300 mm) through an adhesive layer; in this case, the adhesion state of the glass plate and the transparent electroconductive resin substrate was evaluated. The light control film was wound around a 3-inch roll; in this case, the state of the roll was evaluated. The evaluation results are also shown in Table 1. The light transmittances of the light control film were each the Y value (%) obtained by measuring the film with a spectroscopic color-difference meter (SZ-Σ90, manufactured by Nippon Denshoku Industries Co., Ltd.) at a visual field angle of 2 degrees, using an A light source.

A cross section of each of the light control films along the thickness direction was checked with an optical microscope through a 200-power visual field. As a result, no interfacial surface was present in the light control layer.

TABLE 1

| Items | Film-thickness of transparent electroconductive resin substrate (μm) | Light control layer film-thickness (μm) | Light transmittance of film (when no voltage was applied) | Light transmittance of film (when voltage was applied) | Curved-surface-formed light control glass evaluation | State of film wound around small diameter core |
|---|---|---|---|---|---|---|
| Example1 | 30 | 90 | 0.7 | 46.5 | Good | Good |
| Example2 | 30 | 45 | 7.0 | 57.6 | Good | Good |
| Example3 | 50 | 90 | 0.6 | 45.3 | Good | Good |
| Example4 | 50 | 45 | 6.8 | 56.4 | Good | Good |
| Example5 | 70 | 90 | 0.6 | 45.6 | Good | Good |
| Example6 | 70 | 45 | 6.7 | 56.0 | Good | Good |
| Comparative Example1 | 125 | 90 | 0.5 | 40.2 | Floated at edge region | Peeled |
| Comparative Example2 | 8 | 90 | 2.7 | 60.5 | Wolly waved | Crushed |

Example 6

The same operations as in Example 5 were conducted except that the light control material was decreased in amount, and the decreased material was applied to set the dry film thickness of the material to 45 μm.

Comparative Example 1

A light control film was produced in the same way as in Example 1 except that the transparent electroconductive resin substrates were each changed to a polyester film (TETLIGHT TCF, manufactured by Oike & Co., Ltd., thickness: 125 μm) coated with a transparent electroconductive film (thickness: 300 Å) made of ITO (indium tin oxide) and having a surface electric resistance of 200 to 300 Ω.

Comparative Example 2

A light control film was produced in the same way as in Example 1 except that the transparent electroconductive resin substrates were each changed to a polyester film (trade name: TRANSPARENT ELECTROCONDUCTIVE FILM, manufactured by Toyobo Co., Ltd., thickness: 8 μm) coated with a transparent electroconductive film (thickness: 300 Å) made of ITO (indium tin oxide) and having a surface electric resistance of 200 to 300 Ω.

The invention claimed is:

1. A light control glass, comprising:
   two glass plates; and
   a light control film being sandwiched between the two glass plates, and the light control film comprising:
   two transparent electroconductive resin substrates; and
   a light control layer sandwiched between the two transparent electroconductive resin substrates,
   wherein the light control layer contains a resin matrix and a light control suspension dispersed in the resin matrix;
   a thickness of the light control layer is from 10 to 200 μm;
   a thickness of the transparent electroconductive resin substrates is from 10 to 80 μm; and
   the light control suspension contains a dispersing medium and light control particles dispersed in the dispersing medium,
   wherein the light control particles are polyiodide, and
   wherein the glass plates each have a curved surface.

2. The light control film according to claim 1, wherein the thicknesses of the two transparent electroconductive resin substrates are equal to each other.

3. The light control film according to claim 1, wherein the light control layer has therein no interfacial surface.

4. A light control glass, comprising:
   two glass plates; and
   a light control film being sandwiched between the two glass plates, and the light control film comprising:
   two transparent electroconductive resin substrates; and a light control layer sandwiched between the two transparent electroconductive resin substrates,
wherein the light control layer contains a resin matrix and a light control suspension dispersed in the resin matrix;
a thickness of the light control layer is from 10 to 200 µm;
a thickness of the transparent electroconductive resin substrates is from 20 to 70 µm; and
the light control suspension contains a dispersing medium and light control particles dispersed in the dispersing medium,
wherein the light control particles are polyiodide, and
wherein the glass plates each have a curved surface.

5. The light control film according to claim 4, wherein the thickness of the two transparent electroconductive resin substrates are equal to each other.

6. The light control film according to claim 4, wherein the light control layer has therein no interfacial surface.

7. A light control glass, comprising:
a glass plate; and
a light control film being adhered onto a single surface of the glass plate having a curved surface, and the light control film comprising:
two transparent electroconductive resin substrates; and
a light control layer sandwiched between the two transparent electroconductive resin substrates;
wherein the light control layer contains a resin matrix and a light control suspension dispersed in the resin matrix;
a thickness of the light control layer is from 10 to 200 µm;
a thickness of the transparent electroconductive resin substrates is from 10 to 80 µm; and
the light control suspension contains a dispersing medium and light control particles dispersed in the dispersing medium, and
wherein the light control particles are polyiodide.

8. The light control film according to claim 7, wherein the thickness of the two transparent electroconductive resin substrates are equal to each other.

9. The light control film according to claim 7, wherein the light control layer has therein no interfacial surface.

10. The light control glass according to claim 1, wherein the dispersing medium is a (meth) acrylic acid ester oligomer having a fluoro group and/or a hydroxyl group.

11. The light control glass according to claim 4, wherein the dispersing medium is a (meth) acrylic acid ester oligomer having a fluoro group and/or a hydroxyl group.

12. The light control glass according to claim 7, wherein the dispersing medium is a (meth) acrylic acid ester oligomer having a fluoro group and/or a hydroxyl group.

* * * * *